US012769722B2

(12) United States Patent
Bathula et al.

(10) Patent No.: US 12,769,722 B2
(45) Date of Patent: Oct. 20, 2026

(54) PROBABILISTIC BITMAPS FOR EFFICIENT DATA COMPARISON

(71) Applicant: Visa International Service Association, San Francisco, CA (US)

(72) Inventors: Venkata Naresh Bathula, Bangalore (IN); Rajat Saraf, Bangalore (IN); Chenchu Ram Biradavolu, Alex Nagar B Colony (IN); Alok Mishra, Bangalore (IN); Aritra Ranjan Das, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/973,581

(22) Filed: Dec. 9, 2024

(65) Prior Publication Data

US 2026/0161631 A1 Jun. 11, 2026

(51) Int. Cl.
*G06F 16/23* (2019.01)
*G06F 16/22* (2019.01)
*G06F 18/2415* (2023.01)

(52) U.S. Cl.
CPC ...... *G06F 16/2365* (2019.01); *G06F 16/2237* (2019.01); *G06F 18/2415* (2023.01)

(58) Field of Classification Search
None
See application file for complete search history.

(56) References Cited

U.S. PATENT DOCUMENTS 7,702,683 B1 * 4/2010 Kirshenbaum ....... G06F 16/152 707/718
11,514,015 B2 11/2022 Agrawal et al.
2007/0288387 A1 * 12/2007 Park ........................ G06F 21/10 705/59
2009/0300022 A1 * 12/2009 Little .................. G06F 16/2365
(Continued)

FOREIGN PATENT DOCUMENTS

CN 112434085 B 4/2023
CN 116993505 A 11/2023
WO 2023117282 A1 6/2023

OTHER PUBLICATIONS

"String Hashing—Algorithms for Competitive Programming," https://cp-algorithms.com/string/string-hashing.html, retrieved from the internet on Nov. 27, 2024, 5 pages.
(Continued)

*Primary Examiner* — Christopher J Raab
(74) *Attorney, Agent, or Firm* — K&L Gates LLP

(57) ABSTRACT

A computer-implemented method processes transaction data using probabilistic structures. The method involves generating a probabilistic bitmap from transaction attributes, which are then organized in a specific order. This bitmap is used to perform transaction data checks by comparing it with other probabilistic bitmaps from different systems. The process includes hashing attribute values, applying a Mod function, and organizing bits to represent these values. The method allows for detecting mismatches or inconsistencies without directly comparing transaction data, thus identifying issues like missing or corrupted data. Additionally, the method supports updating bitmaps with new data and generating reports based on these checks.

18 Claims, 9 Drawing Sheets

(56) References Cited

U.S. PATENT DOCUMENTS

| | | | | |
|---|---|---|---|---|
| 2014/0201129 | A1* | 7/2014 | Gupta | G06F 16/2237 707/602 |
| 2015/0169655 | A1* | 6/2015 | Gupta | G06F 16/254 707/602 |
| 2017/0193382 | A1* | 7/2017 | Villa | G06F 16/2477 |
| 2020/0050676 | A1 | 2/2020 | Li et al. | |
| 2021/0319052 | A1* | 10/2021 | Park | G06F 16/3346 |
| 2022/0366440 | A1* | 11/2022 | Shinde | G06Q 30/0204 |
| 2023/0148215 | A1* | 5/2023 | Helland | G06F 16/24562 707/747 |

OTHER PUBLICATIONS

International Search Report for Written Opinion for corresponding International Application No. PCT/US2025/058278 mailed on Apr. 14, 2026.

* cited by examiner

200

| DICTIONARY TABLE | |
|---|---|
| BIT POSITION | ATTRIBUTE NAME |
| 1 | FIRST NAME |
| 2 | LAST NAME |
| 3 | MIDDLE NAME |
| 4 | ADDRESS LANE 1 |
| . . . | . . . |
| 100 | COUNTRY |

FIG. 2

500

Root-causing $$\sum_{a=0}^{n} f(a) > \sum_{a=0}^{n} g(a)$$

- a is attribute number & n are total attributes to be compared
- f(a) is the count of mismatches for a given attribute
- g(a) is the count of root-causes associated with attribute a, if mismatch exists

FIG. 7

PROBABILISTIC BITMAPS FOR EFFICIENT DATA COMPARISON

TECHNICAL FIELD

The following disclosure relates generally to methods and system for efficient data comparison.

BRIEF DESCRIPTION

One general aspect of the present disclosure includes a computer-implemented method. The computer-implemented method also includes generating a probabilistic bitmap based on transaction attributes of transaction data processed by a system, where the probabilistic bitmap represents the transaction attributes in a determined order; and performing a transaction data check based on the probabilistic bitmap and one or more other probabilistic bitmaps associated with one or more other systems that process the transaction data.

One general aspect of the present disclosure includes a computer-implemented method. The computer-implemented method includes generating a first probabilistic structure based on transaction attributes of transaction data processed by a first system, where the first probabilistic structure represents the transaction attributes in a determined order; and comparing the first probabilistic structure with a second probabilistic structure generated based on a related transaction data processed by a second system, detecting inconsistencies between the first system and the second system based on the comparison.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
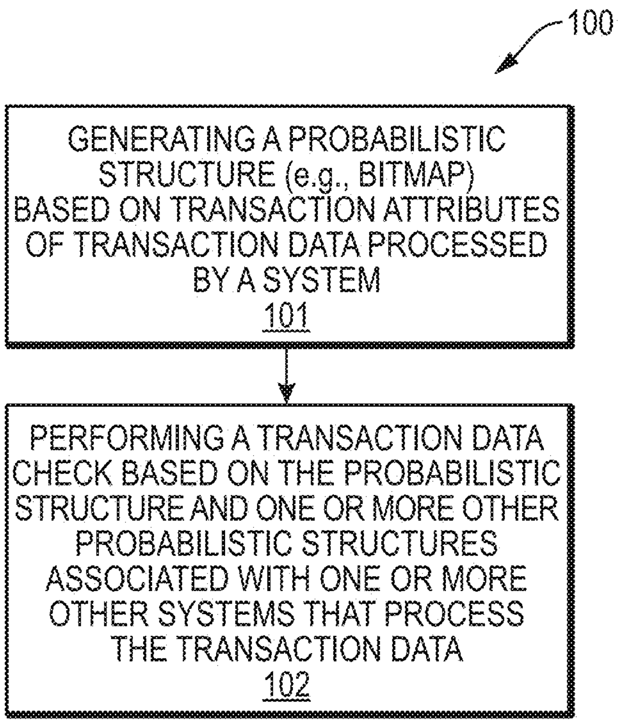

The systems and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 is a flow diagram illustrating a computer-implemented method, according to some aspects of the present disclosure.

FIG. 2 is dictionary table, according to some aspects of the present disclosure.

Figure 3:
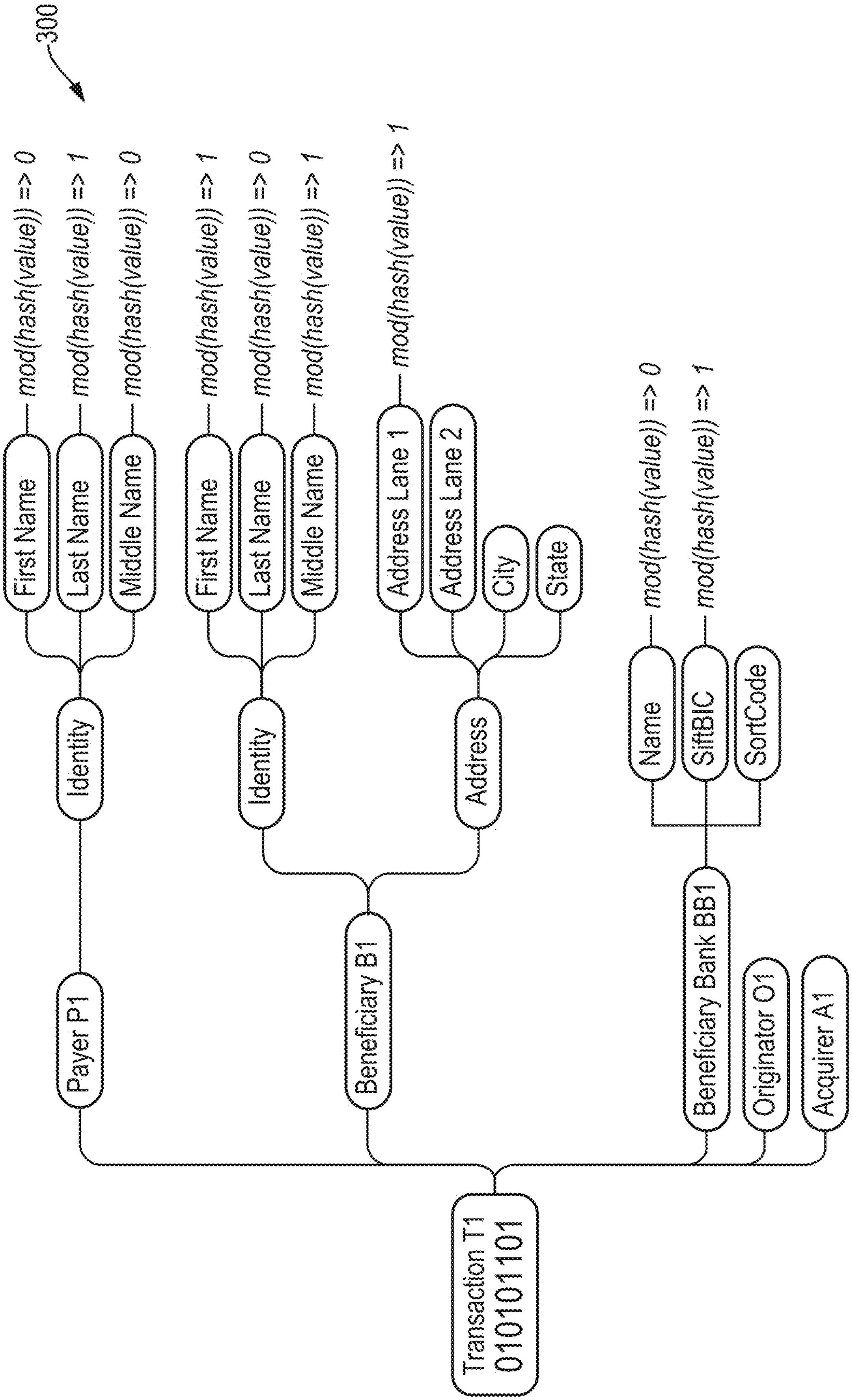

FIG. 3 is a method for developing a bitmap, according to some aspects of the present disclosure.

Figure 4:
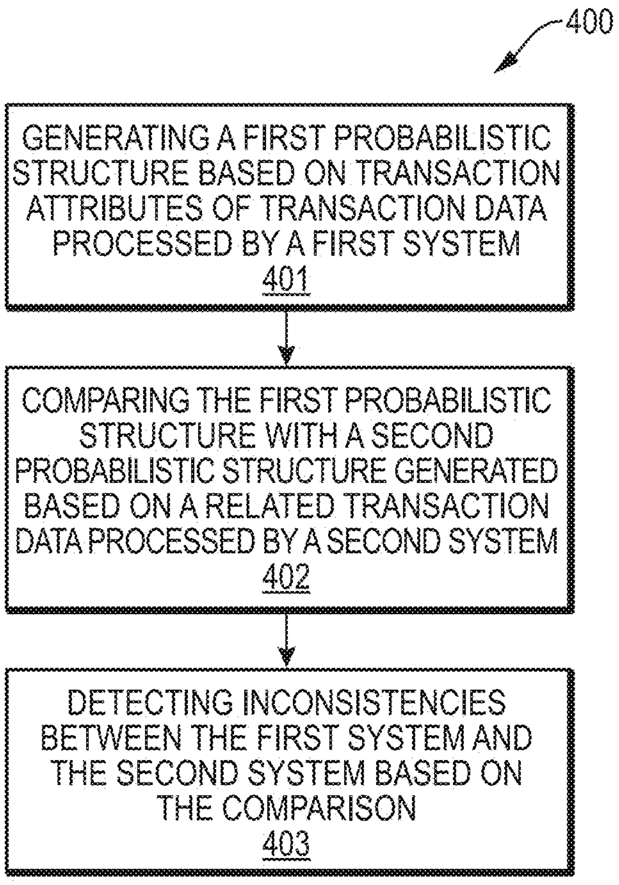

FIG. 4 is a flow diagram illustrating a computer-implemented method, according to some aspects of the present disclosure.

Figure 5:
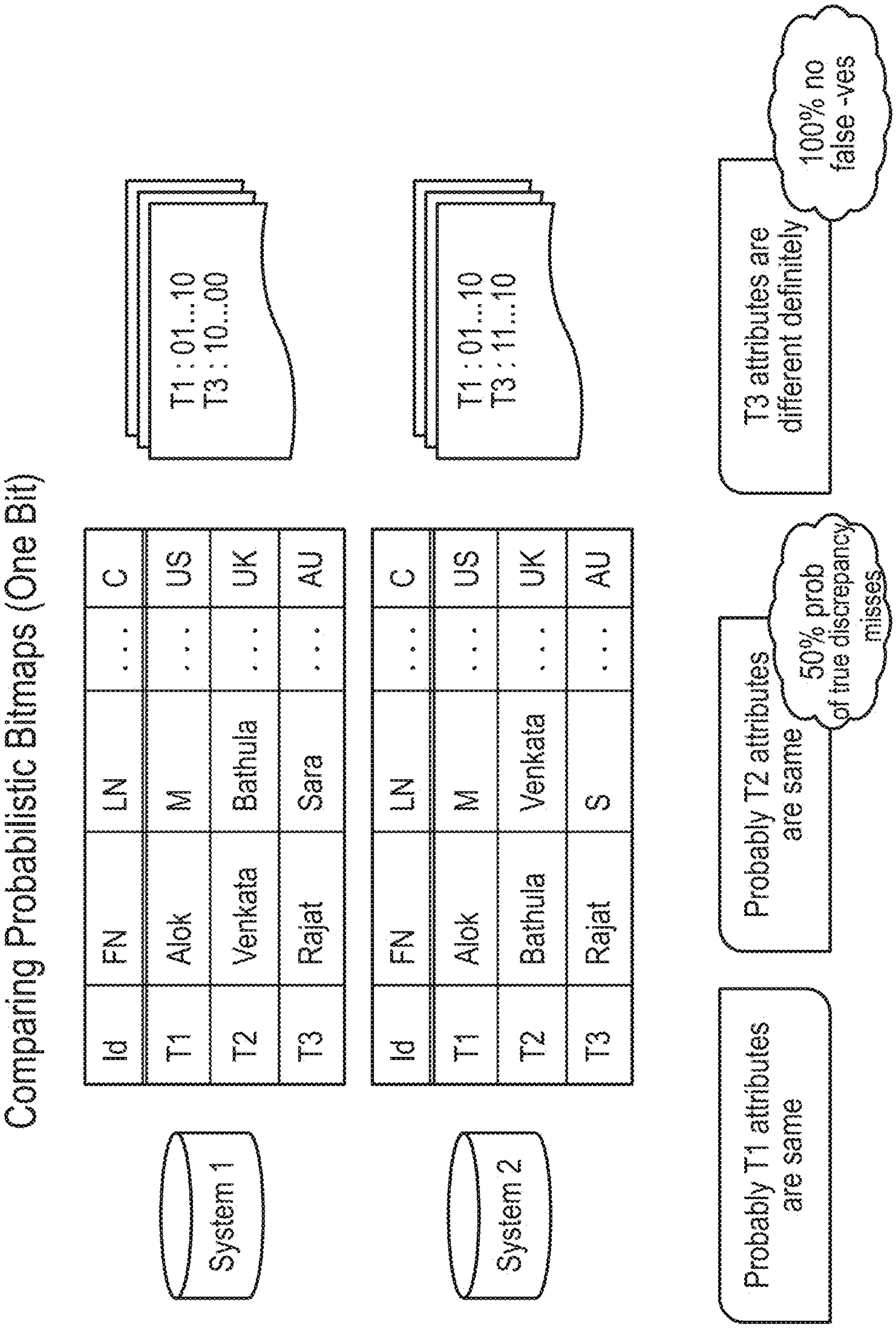

FIG. 5 illustrates a single-bit representation of probabilistic bitmap & bitmap comparison, according to some aspects of the present disclosure.

Figure 6:
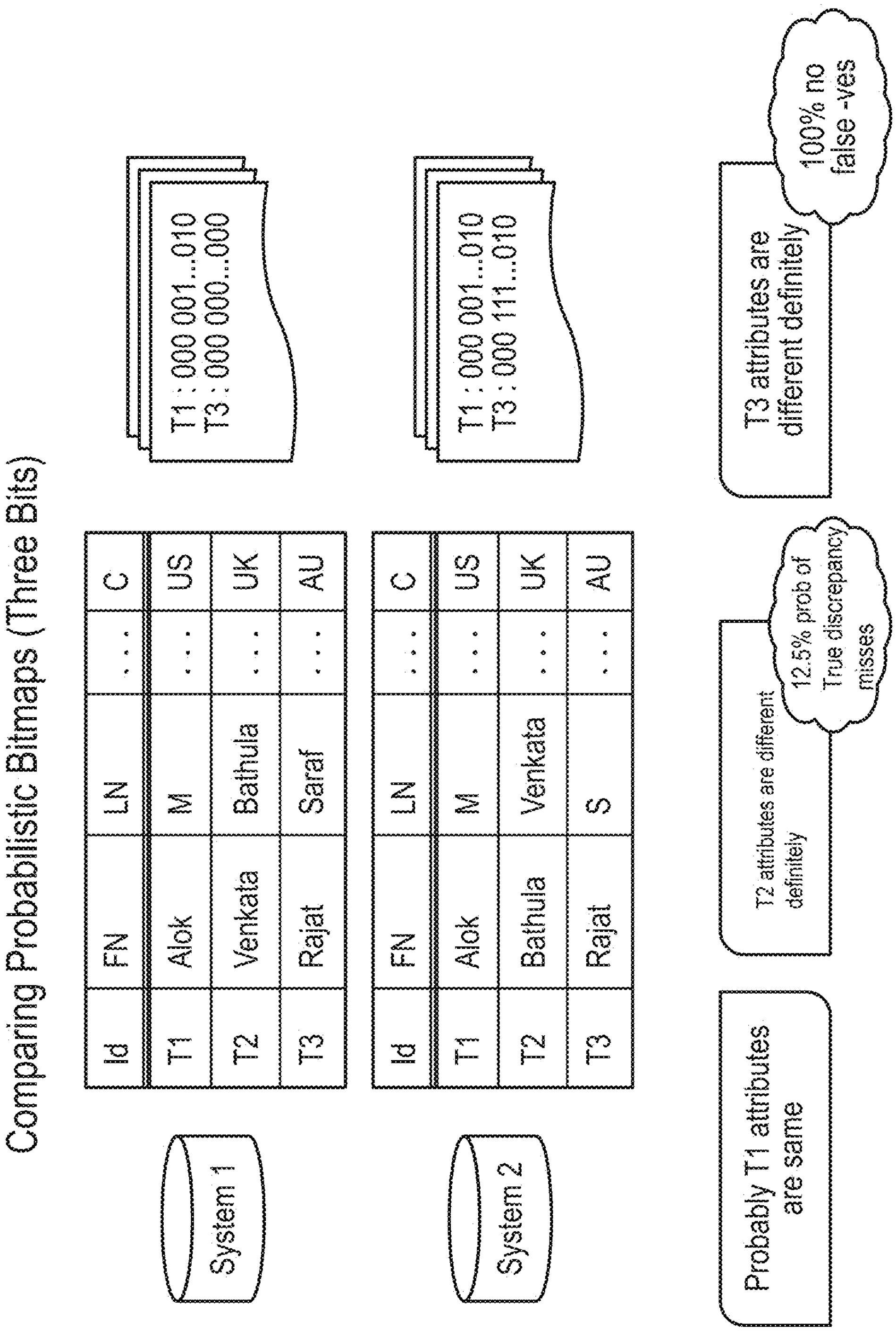

FIG. 6 illustrates a three-bit representation of probabilistic bitmap & bitmap comparison, according to some aspects of the present disclosure.

FIG. 7 illustrates a root cause analysis, according to some aspects of the present disclosure.

Figure 8:
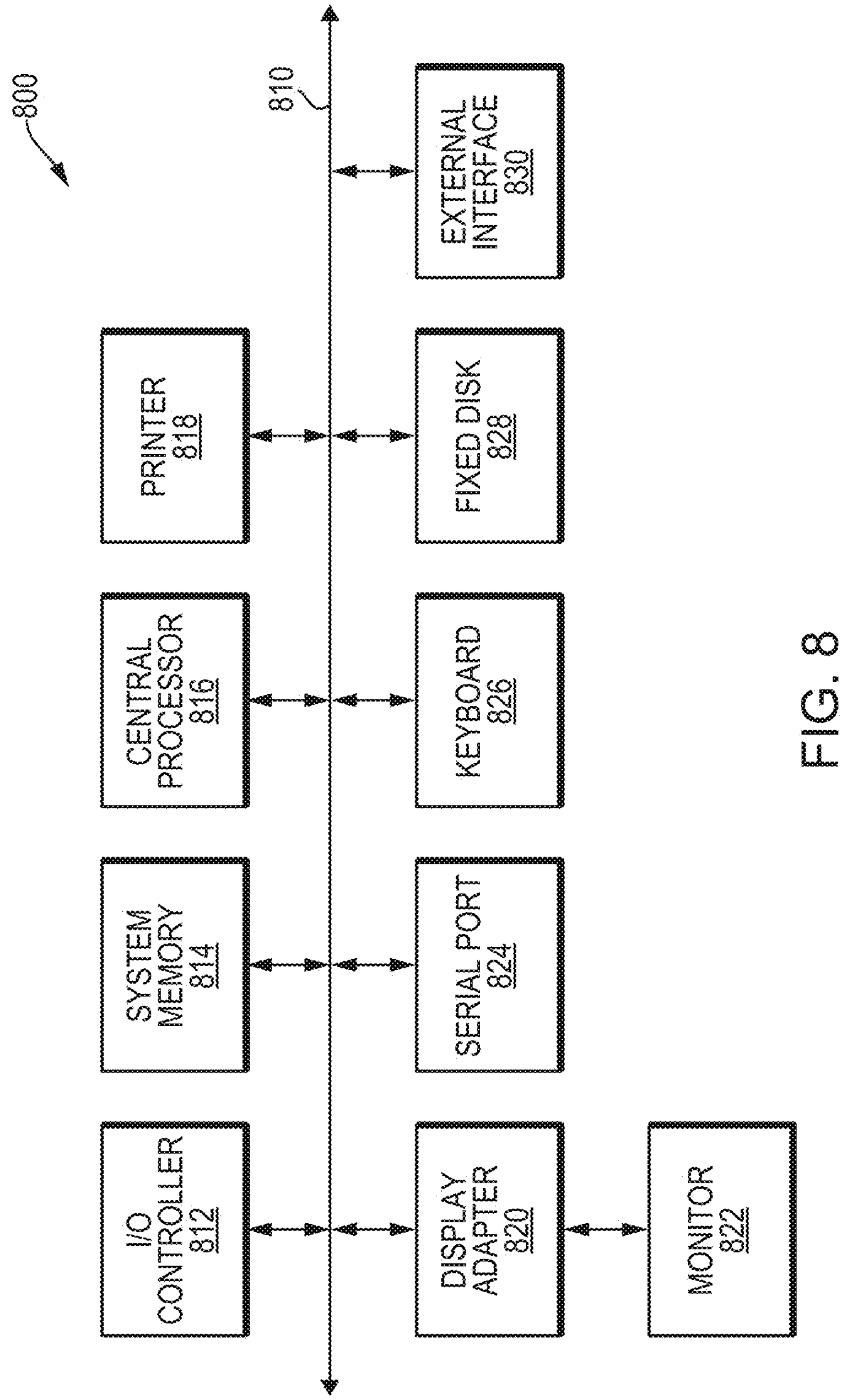

FIG. 8 illustrates a computer apparatus according to some embodiments of the present disclosure.

Figure 9:
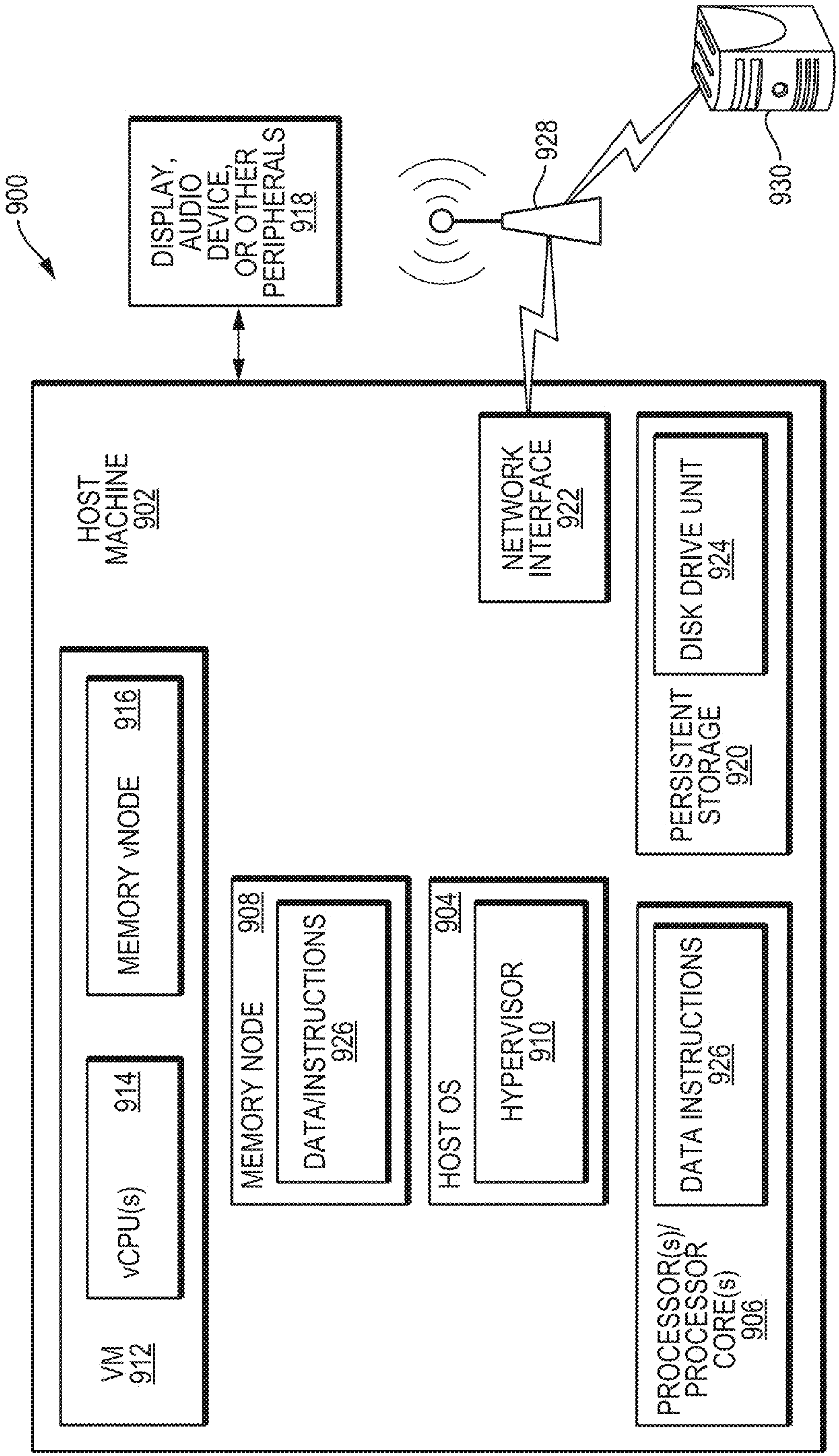

FIG. 9 illustrates a system according to some embodiments of the present disclosure.

DESCRIPTION

The following disclosure may provide exemplary systems, devices, and methods for transaction data comparison. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

As used herein, the term "payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer, or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

As used herein, the term "system" may refer to one or more computing devices or combinations of computing devices (e.g., processors, servers, client devices, software applications, components of such, and/or the like).

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

In many real-world scenarios, such as financial services, retail, or other transactional environments, data flows through multiple stages. For example, a transaction may pass through various microservices in real time, be processed by compliance tools, and eventually be transferred to data warehouses for analytics and reporting. During this journey, transaction data may become inconsistent due to transformations, data corruption, or mismatches between systems. Traditional methods for identifying discrepancies rely on storing and comparing the complete transaction data, including PII, which exposes the data to security risks and raises privacy concerns. To overcome these issues, various embodiments of the present disclosure offer solutions that represent transaction data fields as probabilistic structures (e.g., bitmaps), which are compact and privacy-preserving. These probabilistic structures allow systems to efficiently compare data for discrepancies without needing to store or share sensitive information.

Various embodiments of the present disclosure relate to methods and systems for generating and using probabilistic structures (e.g., bitmaps) to efficiently compare transaction data across multiple systems without the need to store or transmit sensitive information such as Personally Identifiable Information (PII). This solution addresses the significant challenge of ensuring data consistency and integrity as transaction data flows through various systems, often undergoing multiple transformations, and is particularly useful in OLTP (Online Transaction Processing) and OLAP (Online Analytical Processing). The probabilistic structures (e.g., bitmaps) represent transaction attributes in a compact, secure, and efficient manner, ensuring privacy while enabling efficient data checks.

Referring to FIG. 1, in some embodiments, a computer-implemented method 100 includes generating 101 a probabilistic structure (e.g., bitmap) based on transaction attributes of transaction data processed by a system. The probabilistic structure represents the transaction attributes in a determined order. The method 100 further includes performing 102 a transaction data check based on the probabilistic structure and one or more other probabilistic structures associated with one or more other systems that process the transaction data.

Referring to FIGS. 2 and 3, in some embodiments, the probabilistic structure is a probabilistic map 300, and generating 101 the probabilistic bitmap includes hashing attribute values of the transaction attributes, performing a Mod function on results of the hashing of the attribute values to generate bits representative of the attribute values, and organizing the bits in a series based on the determined order of the transaction attributes.

In one embodiment, as seen in FIG. 2, a dictionary table 200 may define specific bit positions for each attribute (e.g., first name, last name, address), which may maintain consistency across bitmaps generated in different systems. This table maps each attribute to a unique bit position. This setup ensures compatibility between systems, as each system uses the same bit positions for identical attributes, facilitating streamlined data comparison processes.

In generating the probabilistic bitmap 300, the method 100 may employ a hash function (e.g., SHA-256 or MurmurHash) on each attribute's value, producing a unique but consistent hashed output for any given input. Hashing ensures that even if two values differ by only a minor detail, their hashed outputs will be distinct, which reduces the likelihood of true discrepancy misses when comparing probabilistic bitmaps. In some embodiments, the hash function converts the attribute's original value into a fixed-length binary sequence (e.g., a 256-bit binary string for SHA-256). The hashing process is deterministic meaning the same attribute value will always yield the same hashed output, providing consistence across systems.

Once the attribute value is hashed, a Modulo (Mod) function is applied to the hashed result. This Mod function may be tailored to map the hashed value into the appropriate bit position within the bitmap, as per the bit positions outlined in the dictionary table 200. A Mod function such as Mod (hash, n) may be used, where n is the size of the bitmap representation or a predefined range for bit positioning within the bit map. The Mod function reduces the hashed output to a single integer that corresponds to a position within the bitmap, allowing efficient bit allocation, minimizing the computational load and ensuring that only a small, manageable number of bits represent each attribute.

In some embodiment, multiple hash functions may be applied to enhance accuracy and minimize true discrepancies being missed. For instance, applying Mod(hash1, n), Mod(hash2, n), etc., may yield different bits for a single attribute, increasing redundancy and ensuring that similar attributes don't produce overlapping bit patterns unintentionally.

In multi-bit allocation scenarios, several bits may represent a single attribute by marking multiple positions in the bitmap according to different Mod results, which further enhances the specificity of each transaction's probabilistic representation.

Once the probabilistic bitmap 300 is created and organized, the bits may be appended and stored in a database, for example. The efficient storage preserves the attribute-based representation, allowing for quick access and retrieval. Furthermore, the bitmap 300 may be periodically updated to reflect new transactions or modifications, ensuring that the database maintains an up-to-date and accurate representation of the transaction attributes.

The stored probabilistic bitmaps may then be utilized in conducting comparative analyses across different systems, thereby supporting various transactional data processes, such as auditing, compliance checks, and data reconciliation. The stored bitmaps enable efficient retrieval and further analysis, allowing systems to conduct additional comparative processes, such as detecting duplicate transactions, validating transaction records, or reconciling data between OLTP and OLAP systems, for example.

In some embodiments, performing the transaction data check includes comparing the probabilistic bitmap to the one or more other probabilistic bitmaps associated with the one or more other systems that process the transaction data. In some embodiments, the one or more other probabilistic bitmaps represent the transaction attributes in the determined order. By comparing these structures, it is possible to identify overlapping transaction attributes, verify consistency, or detect anomalies. The inclusion of multiple systems adds robustness to the analysis, allowing for cross-referencing and validation across diverse transaction sources. This approach supports rapid detection of potential mismatches or duplicate entries, thus enhancing data integrity and reliability across connected systems.

In some embodiments, a computer-implemented method 400 includes generating 401 a first probabilistic structure based on transaction attributes of transaction data processed by a first system. The first probabilistic structure represents the transaction attributes in a determined order. The method 400 further includes comparing 402 the first probabilistic structure with a second probabilistic structure generated based on a related transaction data processed by a second system. The method 400 further includes detecting 403 inconsistencies between the first system and the second system based on the comparison.

In some embodiments, the method 100, or the method 400, compares transaction data across two systems by using probabilistic bitmaps. Each system independently generates a bitmap for every transaction, where each bit position in the bitmap represents a specific attribute, such as the first name, last name, or country of the transaction. This probabilistic representation enables the systems to perform fast and efficient comparisons of transaction data attributes without needing to store or handle the raw data directly.

The comparison may operate on single-bit (FIG. 5) or multi-bit levels (FIG. 6), depending on the complexity and accuracy requirements of the analysis. Single-bit comparisons allow for quick, initial checks to identify any potential discrepancies. In contrast, multi-bit comparisons provide a finer granularity for validation, ensuring that systems can confirm whether all relevant transaction attributes match or identify minor discrepancies between attributes with better probability.

In one embodiment, shown in FIG. 5, each attribute in a transaction is represented by a single bit within the bitmap. This "one-bit comparison" allows for a quick, preliminary verification. For instance, if System 1 and System 2 each process transactions labeled T1 & T2, they produce identical bitmaps for this transaction, suggesting the attributes are likely the same across both systems. However, in transaction T3, there is a visible difference in the bitmaps between System 1 and System 2, indicating a discrepancy in the attributes between the two systems. While the one-bit comparison method is fast and guarantees that any mismatched bits reliably indicate an attribute discrepancy, it also has a 50% probability of true discrepancies being missed. Therefore, this method is more suitable for initial checks but may lack precision for final verification.

In another embodiment, as illustrated in FIG. 6, the comparison involves representing each attribute across three bits. This "three-bit comparison" approach allows for greater redundancy, making it less susceptible to true discrepancy misses. In the case of T1, the three-bit bitmaps from both System 1 and System 2 match exactly, indicating attribute consistency across the two systems. However, transactions T2 & T3 reveals a slight difference in one of the three-bit segments, indicating difference between the two systems' bitmaps, signaling that the attributes for T2 & T3 differ between System 1 and System 2. By using three bits per attribute, the probability of true discrepancies being missed drops to 12.5%, for example.

In some embodiments, performing the transaction data check relies exclusively on probabilistic bitmaps, eliminating the need for direct comparison of raw transaction data across systems. As such, performing the transaction data check may involve comparing only probabilistic bitmaps without a direct comparison of the transaction data.

In some embodiments, performing the transaction data check is achieved without receiving, or requiring, transaction data from other systems. Each system independently generates its probabilistic bitmap for a transaction, which is then compared with bitmaps from other systems. By only comparing the probabilistic bitmaps, which are compact representations of transaction attributes, the system significantly reduces the data load, making the process scalable even for high volumes of transactions in real-time processing environments. The probabilistic bitmap serves as a fingerprint of the transaction data, enabling cross-system verification without any actual data exchange.

In some embodiments, performing the transaction data check includes identifying a bitmap mismatch. The bitmap mismatch may be indicative of one or more of missing, corrupted, or mismatched attribute values of transaction attributes in the transaction data. For instance, a mismatch in the bitmap may suggest that specific attributes, such as the transaction amount or merchant information, differ between systems. By using bitwise mismatches as indicators, the systems that process the transaction data become effective in identifying and flagging data integrity issues.

In some embodiments, the method 100, or method 200, further involves updating the transaction data based on the bitmap mismatch. Where a bitmap mismatch is detected, the method may include updating the transaction data to correct the identified discrepancies. For instance, if the mismatch indicates a missing attribute, the system (e.g., system 1 or 2) can retrieve or regenerate the missing data based on predefined rules or reference data sources. Similarly, in cases where attribute values are corrupted, the system (e.g., system 1 or 2) may initiate a data recovery process or flag the affected transaction for manual review.

In some embodiments, the method further includes updating the probabilistic bitmap in response to receiving new transaction data. Each update to the bitmap may be applied in a manner consistent with the established hashing and Mod function processes, preserving the integrity of the bitmap structure.

In some embodiments, the method further includes generating a report of the transaction data check based on the comparison of the probabilistic bitmap and the one or more other probabilistic bitmaps. This report may detail the comparison outcomes between the local probabilistic bitmap and those from other systems, highlighting any mismatches, probable matches, or confirmed discrepancies. These reports may be further utilized for audit purposes, compliance monitoring, or operational reviews, providing a transparent overview of data validation efforts and contributing to the accountability of cross-system data processes.

In some embodiments, as illustrated in FIG. 7, the method 100, or the method 400, further involves performing a root-cause analysis 500 based on detecting mismatches or discrepancies. For each mismatched attribute, the method may quantify the frequency of errors (f(a)) and correlates it with potential root causes (g(a)) to isolate specific factors contributing to mismatches, whether from manual data input errors or new code deployments.

In some embodiments, the method may persistently monitor and ensure data alignment, even during updates or when new code releases introduce potential data variances. When discrepancies are detected at the attribute level in large datasets, a frequency-based model is employed to track how often mismatches occur for each specific attribute across transactions.

In cases where new code releases cause bitmap discrepancies, the method may detect mismatches early on, identify affected attributes, and automatically trigger error correction processes or initiate a rollback if needed.

In some embodiments, the method may utilize historical data patterns and logs to correlate detected mismatches with probable root causes. For instance, attributes with a high count of mismatches (denoted as f(a)) are cross-referenced against known root causes (noted as g(a)) such as recent code deployments, configuration changes, or integration updates between systems. The method may then identify patterns, such as spikes in mismatches following specific updates or during certain operational shifts, providing clues about the underlying issues.

Once potential root causes are identified, the method may further include a targeted approach to resolution. For high-impact discrepancies, it may initiate corrective actions automatically. Alternatively, the method may include prompting detailed diagnostics for identified attributes, providing insights that guide developers in refining data handling logic, updating attribute mappings, or adjusting data integration workflows.

In some embodiments, the root cause analysis may include a feedback loop, where corrected issues and identified causes are documented and stored within a reference database. This cumulative knowledge base may enhance the predictive capabilities for future transactions, improving the accuracy of mismatch detection and the speed of root cause identification over time.

One general aspect of the present disclosure includes a computer-implemented method. The computer-implemented method also includes generating a probabilistic bitmap based on transaction attributes of transaction data processed by a system, where the probabilistic bitmap represents the transaction attributes in a determined order; and performing a transaction data check based on the probabilistic bitmap and one or more other probabilistic bitmaps associated with one or more other systems that process the transaction data. Other embodiments include corresponding computer systems, apparatus, and computer programs recorded on one or more computer storage devices, each configured to perform the actions of the computer-implemented method.

One general aspect of the present disclosure includes a computer-implemented method. The computer-implemented method includes generating a first probabilistic structure based on transaction attributes of transaction data processed by a first system, where the first probabilistic structure represents the transaction attributes in a determined order; and comparing the first probabilistic structure with a second probabilistic structure generated based on a related transaction data processed by a second system, detecting inconsistencies between the first system and the second system based on the comparison. Other embodiments include corresponding computer systems, apparatus, and computer programs recorded on one or more computer storage devices, each configured to perform the actions of the computer-implemented method.

In one or more implementations, generating the probabilistic bitmap may include: hashing attribute values of the transaction attributes; performing a mod function on results of the hashing of the attribute values to generate bits representative of the attribute values; and organizing the bits in a series based on the determined order of the transaction attributes. Performing the transaction data check may include comparing the probabilistic bitmap to the one or more other probabilistic bitmaps associated with the one or more other systems that process the transaction data. The one or more other probabilistic bitmaps represent the transaction attributes in the determined order. Performing the transaction data check may include comparing only probabilistic bitmaps without a direct comparison of the transaction data. Performing the transaction data check is achieved without receiving transaction data from the one or more other systems. Performing the transaction data check may include identifying a bitmap mismatch. The bitmap mismatch is indicative of one or more of missing, corrupted, or mismatched attribute values of transaction attributes in the transaction data. The computer-implemented method may include updating the transaction data based on the bitmap mismatch. The transaction attributes include at least one of transaction amount, transaction date, merchant information, or payment method. The method may include updating the probabilistic bitmap in response to receiving new transaction data. The method may include, generating a report of the transaction data check based on the comparison of the probabilistic bitmap and the one or more other probabilistic bitmaps. The method may include performing a root cause analysis.

The systems and methods, as described herein may include, or make use of, a number of computer apparatuses, computer systems, or the like. In other words, to utilize the systems and methods disclosed herein, at least one of a computer apparatus, computer system, or the like may be implemented. Each of these computer apparatuses, computer systems, or the like are described in greater detail below with respect to the computer apparatus 800 shown in FIG. 8 and the example system 900 shown in FIG. 8, which provide a connection between the solution disclosed herein and how such a solution may be implemented within a business entity, such as a payment network, a processing network, a payment processing network, or the like.

FIG. 8 is a block diagram of a computer apparatus 800 with data processing subsystems or components, according to at least one aspect of the present disclosure. The subsystems shown in FIG. 9 are interconnected via a system bus 810. Additional subsystems such as a printer 818, keyboard 826, fixed disk 828 (or other memory comprising computer-readable media), monitor 822 (which is coupled to a display adapter 820), and others are shown. Peripherals and input/output (I/O) devices, which couple to an I/O controller 812 (which can be a processor or other suitable controller), can be connected to the computer system by any number of means known in the art, such as a serial port 824. For example, the serial port 824 or external interface 830 can be used to connect the computer apparatus to a wide area network such as the Internet, a mouse input device, or a scanner. The interconnection via system bus 810 allows the central processor 816 to communicate with each subsystem and to control the execution of instructions from system memory 814 or the fixed disk 828, as well as the exchange of information between subsystems. The system memory 814 and/or the fixed disk 828 may embody a computer-readable medium.

FIG. 9 is a diagrammatic representation of an example system 900 that includes a host machine 902 within which a set of instructions to perform any one or more of the methodologies discussed herein may be executed, according to at least one aspect of the present disclosure. In various aspects, the host machine 902 operates as a stand-alone device or may be connected (e.g., networked) to other machines. In a networked deployment, the host machine 902 may operate in the capacity of a server or a client machine in a server-client network environment, or as a peer machine in a peer-to-peer (or distributed) network environment. The host machine 902 may be a computer or computing device, a personal computer (PC); a tablet PC; a set-top box; a personal digital assistant; a cellular telephone; a portable music player (e.g., a portable hard drive audio device, such as an Moving Picture Experts Group Audio Layer 3 (MP3) player); a web appliance; a network router, switch, or bridge; or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 900 includes the host machine 902, running a host operating system (OS) 904 on a processor or multiple processor(s)/processor core(s) 906 (e.g., a central processing unit (CPU), a graphics processing unit, or both), and various memory nodes 908. The host OS 904 may include a hypervisor 910, which is able to control the functions and/or communicate with a virtual machine (VM) 912 running on machine-readable media. The VM 912 also may include a virtual CPU or vCPU 914. The memory nodes 908 may be linked or pinned to virtual memory nodes or vNodes 916. When the memory node 908 is linked or pinned to a corresponding vNode 916, then data may be mapped directly from the memory nodes 908 to their corresponding vNodes 916.

All the various components shown in host machine 902 may be connected with and to each other or communicate to each other via a bus (not shown) or via other coupling or communication channels or mechanisms. The host machine 902 may further include a video display, audio device, or other peripherals 918 (e.g., a liquid crystal display; alphanumeric input device(s) including, e.g., a keyboard; a cursor control device, e.g., a mouse; a voice recognition or biometric verification unit; an external drive; a signal generation device, e.g., a speaker); a persistent storage device 920 (also referred to as disk drive unit); and a network interface device 922. The host machine 902 may further include a data encryption module (not shown) to encrypt data. The components provided in the host machine 902 are those typically found in computer systems that may be suitable for use with aspects of the present disclosure and are intended to represent a broad category of such computer components that are known in the art. Thus, the system 900 can be a server, minicomputer, mainframe computer, or any other computer system. The computer may also include different bus configurations, networked platforms, multi-processor platforms, and the like. Various OSs may be used, including UNIX, LINUX, WINDOWS, QNX ANDROID, IOS, CHROME, TIZEN, and other suitable OSs.

The disk drive unit 924 also may be a solid-state drive, a hard disk drive, or other drive that includes a computer or machine-readable medium on which is stored one or more sets of instructions and data structures (e.g., data/instructions 926) embodying or utilizing any one or more of the methodologies or functions described herein. The data/instructions 926 also may reside, completely or at least partially, within the main memory node 908 and/or within the processor(s) 906 during execution thereof by the host machine 902. The data/instructions 926 may further be transmitted or received over a network 928 via the network interface device 922 utilizing any one of several well-known transfer protocols (e.g., Hyper Text Transfer Protocol (HTTP)).

The processor(s) 906 and memory nodes 908 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 902 and that causes the host machine 902 to perform any one or more of the methodologies of the present application or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read-only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service and that the computing devices may include one or more processors, buses, memory devices, display devices, I/O devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

Suitable networks may include or interface with any one or more of, for instance, a local intranet; a personal area network (PAN); a local area network (LAN); a wide area network (WAN); a metropolitan area network (MAN); a virtual private network (VPN); a storage area network (SAN); a frame relay connection; an advanced intelligent network (AIN) connection; a synchronous optical network (SONET) connection; a digital T1, T3, E1, or E3 line; a digital data service (DDS) connection; a digital subscriber line (DSL) connection; an Ethernet connection; an integrated services digital network (ISDN) line; a dial-up port, such as a V.90, V.34, or V.34bis analog modem connection; a cable modem; an Asynchronous Transfer Mode (ATM) connection; or an Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, global positioning system (GPS), cellular digital packet data (CDPD), Research in Motion, Limited (RIM) duplex paging network, Bluetooth radio, or an Institute of Electrical and Electronics Engineers (IEEE) 802.11-based radio frequency (RF) network. The network 928 can further include or interface with any one or more of an RS-232 serial connection, an IEEE-1394 (Firewire) connection, a Fiber Channel connection, an IrDA (infrared (IR)) port, a Small Computer Systems Interface (SCSI) connection, a Universal Serial Bus (USB) connection or other wired or wireless, digital, or analog interface or connection, mesh, or Digi© networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 902, with each server 930 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during RF and IR data communications. Common forms of computer-readable media include, for example, a flexible disk, a hard disk, magnetic tape, any other magnetic medium, a compact disc ROM (CD-ROM) disk, digital video disc, any other optical medium, any other physical medium with patterns of marks or holes, a RAM, a programmable ROM, an erasable programmable ROM (EPROM), an electrically erasable programmable ROM (EEPROM), a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet service provider).

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as one or more program products in a variety of forms, and an illustrative form of the subject matter described herein applies regardless of the particular type of signal-bearing medium used to actually carry out the distribution.

Instructions used to program logic to perform various disclosed aspects can be stored within a memory in the system, such as dynamic RAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), including, but not limited to, floppy diskettes, optical disks, CD-ROMs, magneto-optical disks, ROM, RAM, EPROM, EEPROM, magnetic or optical cards, flash memory, or a tangible, machine-readable storage used in the transmission of information over the Internet via electrical, optical, acoustical, or other forms of propagated signals (e.g., carrier waves, IR signals, digital signals). Accordingly, the non-transitory computer-readable medium includes any type of tangible machine-readable medium suitable for storing or transmitting electronic instructions or information in a form readable by a machine (e.g., a computer).

Any of the software components or functions described in this application may be implemented as software code to be executed by a processor using any suitable computer language, such as, for example, Python, Java, C++, or Perl, using, for example, conventional or object-oriented techniques. The software code may be stored as a series of instructions or commands on a computer-readable medium, such as RAM, ROM, a magnetic medium such as a hard drive or a floppy disk, or an optical medium such as a CD-ROM. Any such computer-readable medium may reside on or within a single computational apparatus and may be present on or within different computational apparatuses within a system or network.

As used in any aspect herein, the term "logic" may refer to an app, software, firmware, and/or circuitry configured to perform any of the aforementioned operations. Software may be embodied as a software package, code, instructions, instruction sets, and/or data recorded on a non-transitory computer-readable storage medium. Firmware may be embodied as code, instructions, instruction sets, and/or data that are hard-coded (e.g., non-volatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states that may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet-switched network. The communication devices may be capable of communicating with each other using a selected packet-switched network communications protocol. One example communications protocol may include an Ethernet communications protocol, which may be capable of permitting communication using a Transmission Control Protocol/Internet Protocol. The Ethernet protocol may comply or be compatible with the Ethernet standard published by the IEEE titled "IEEE 802.3 Standard," published in December 2008 and/or later versions of this standard. Alternatively, or additionally, the communication devices may be capable of communicating with each other using an X.25 communications protocol. The X.25 communications protocol may comply or be compatible with a standard promulgated by the International Telecommunication Union-Telecommunication Standardization Sector. Alternatively, or additionally, the communication devices may be capable of communicating with each other using a frame relay communications protocol. The frame relay communications protocol may comply or be compatible with a standard promulgated by Consultative Committee for International Telegraph and Telephone and/or the American National Standards Institute. Alternatively, or additionally, the transceivers may be capable of communicating with each other using the ATM communications protocol. The ATM communications protocol may comply or be compatible with an ATM standard published by the ATM Forum titled "ATM-MPLS Network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like refer to the action and processes of a computer system, or similar electronic computing device, that manipulates and transforms data represented as physical (electronic) quantities within the computer system's registers and memories into other data similarly represented as physical quantities within the computer system memories, registers, or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including, but not limited to"; the term "having" should be interpreted as "having at least"; the term "includes" should be interpreted as "includes, but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to claims containing only one such recitation, even when the same claim includes the introductory phrases “one or more” or “at least one” and indefinite articles such as “a” or “an” (e.g., “a” and/or “an” should typically be interpreted to mean “at least one” or “one or more”); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of “two recitations,” without other modifiers, typically means at least two recitations, or two or more recitations). Furthermore, in those instances where a convention analogous to “at least one of A, B, and C, etc.” is used, in general, such a construction is intended in the sense one having skill in the art would understand the convention (e.g., “a system having at least one of A, B, and C” would include, but not be limited to, systems that have A alone, B alone, C alone, A and B together, A and C together, B and C together, and/or A, B, and C together). In those instances where a convention analogous to “at least one of A, B, or C, etc.” is used, in general, such a construction is intended in the sense one having skill in the art would understand the convention (e.g., “a system having at least one of A, B, or C” would include, but not be limited to, systems that have A alone, B alone, C alone, A and B together, A and C together, B and C together, and/or A, B, and C together). It will be further understood by those skilled in the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase “A or B” will be typically understood to include the possibilities of “A,” “B,” or “A and B.”

With respect to the appended claims, those skilled in the art will appreciate that recited operations therein may generally be performed in any order. Also, although various operational flow diagrams are presented in sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

It is worthy to note that any reference to “one aspect,” “an aspect,” “an exemplification,” “one exemplification,” and the like means that a particular feature, structure, or characteristic described in connection with the aspect is included in at least one aspect. Thus, appearances of the phrases “in one aspect,” “in an aspect,” “in an exemplification,” and “in one exemplification” in various places throughout the specification are not necessarily all referring to the same aspect. Furthermore, the features, structures, or characteristics may be combined in any suitable manner in one or more aspects.

As used herein, the singular form of “a,” “an,” and “the” include the plural references unless the context clearly dictates otherwise.

Any patent application, patent, non-patent publication, or other disclosure material referred to in this specification and/or listed in any Application Data Sheet is incorporated by reference herein, to the extent that the incorporated material is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material. None is admitted to be prior art.

In summary, numerous benefits have been described that result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described to illustrate principles and practical application to thereby enable one of ordinary skill in the art to utilize the various forms with various modifications as are suited to the particular use contemplated. It is intended that the claims submitted herewith define the overall scope.

What is claimed is:

1. A computer-implemented method, comprising:
- generating a probabilistic bitmap based on transaction attributes of transaction data processed by a system, wherein the probabilistic bitmap represents the transaction attributes in a determined order, wherein generating the probabilistic bitmap comprises:
  - hashing attribute values of the transaction attributes;
  - performing a Mod function on results of the hashing of the attribute values to generate bits representative of the attribute values; and
  - organizing the bits in a series based on the determined order of the transaction attributes; and
- performing a transaction data check based on the probabilistic bitmap and one or more other probabilistic bitmaps associated with one or more other systems that process the transaction data.

2. The computer-implemented method of claim 1, wherein performing the transaction data check comprises comparing the probabilistic bitmap to the one or more other probabilistic bitmaps associated with the one or more other systems that process the transaction data.

3. The computer-implemented method of claim 2, wherein the one or more other probabilistic bitmaps represent the transaction attributes in the determined order.

4. The computer-implemented method of claim 1, wherein performing the transaction data check comprises comparing only probabilistic bitmaps without a direct comparison of the transaction data.

5. The computer-implemented method of claim 1, wherein performing the transaction data check is achieved without receiving transaction data from the one or more other systems.

6. The computer-implemented method of claim 1, wherein performing the transaction data check comprises identifying a bitmap mismatch.

7. The computer-implemented method of claim 6, wherein the bitmap mismatch is indicative of one or more of missing, corrupted, or mismatched attribute values of transaction attributes in the transaction data.

8. The computer-implemented method of claim 6, further comprising updating the transaction data based on the bitmap mismatch.

9. The method of claim 1, wherein the transaction attributes include at least one of transaction amount, transaction date, merchant information, or payment method.

10. The method of claim 1, further comprising updating the probabilistic bitmap in response to receiving new transaction data.

11. The method of claim 1, further comprising, generating a report of the transaction data check based on the comparison of the probabilistic bitmap and the one or more other probabilistic bitmaps.

12. The method of claim 1, further comprising performing a root cause analysis.

13. A computer-implemented method, comprising:

generating a first probabilistic structure based on transaction attributes of transaction data processed by a first system, wherein the first probabilistic structure represents the transaction attributes in a determined order, and wherein generating the first probabilistic structure comprises:

hashing attribute values of the transaction attributes;

performing a Mod function on results of the hashing of the attribute values to generate bits representative of the attribute values; and organizing the bits in a series based on the determined order of the transaction attributes; and comparing the first probabilistic structure with a second probabilistic structure generated based on a related transaction data processed by a second system;

detecting inconsistencies between the first system and the second system based on the comparison.

14. The computer-implemented method of claim 13, wherein the second probabilistic structure represents the transaction attributes in the determined order.

15. The computer-implemented method of claim 14, wherein detecting the inconsistencies between the first system and the second system comprises identifying a transaction data mismatch based on the comparison.

16. The computer-implemented method of claim 14, wherein detecting the inconsistencies is achieved without exchanging the transaction data.

17. The computer-implemented method of claim 14, wherein detecting the inconsistencies comprises identifying bitmap mismatches.

18. The computer-implemented method of claim 14, further comprising performing a root cause analysis based on the detected inconsistencies.

* * * * *